United States Patent [19]

Nelson

[11] 4,065,614
[45] Dec. 27, 1977

[54] INTERMEDIATE AMIDE PECTINS

[75] Inventor: Denny B. Nelson, Corona, Calif.

[73] Assignee: Sunkist Growers, Inc., Sherman Oaks, Calif.

[21] Appl. No.: 648,733

[22] Filed: Jan. 13, 1976

[51] Int. Cl.$^2$ ............................................. C08B 37/06
[52] U.S. Cl. ............................................................ 536/2
[58] Field of Search .......................................... 536/2

[56] References Cited

U.S. PATENT DOCUMENTS

| | | | |
|---|---|---|---|
| 2,448,818 | 9/1948 | McCready et al. | 536/2 |
| 2,478,170 | 8/1949 | Maclay et al. | 536/2 |
| 2,480,710 | 8/1949 | Bryant | 536/2 |
| 3,622,559 | 11/1971 | Wiles et al. | 536/2 |
| 3,835,111 | 9/1974 | Ehrlich et al. | 536/2 |

*Primary Examiner*—Ronald W. Griffin
*Attorney, Agent, or Firm*—Paul A. Weilein

[57] ABSTRACT

Novel pectin derivatives having important and useful gel properties are made by direct amidation with high levels of ammonia at low temperatures.

The desirable pectin derivatives have not more than 39% carboxyl groups and at least 27% amide groups. The most desirable pectin derivatives have from 56 to 70% acid plus amide groups, based on the total level of anhydrogalacturonic acid units as 100%, and the preferred amide level is between 30 and 35%. The pectins form 20 to 40% soluble solids gels that are improved in texture and less prone to syneresis over the gel pH range 3 to 4 with a wide range of added calcium ion when compared to gels made with currently known pectins.

21 Claims, 7 Drawing Figures

INFLUENCE OF GEL pH ON THE GEL POWER AND GEL STRENGTH OF A PRESENT TYPE OF LOW-ESTER PECTIN IN A 30% SOLUBLE SOLIDS GEL MADE WITH 30 mg $Ca^{2+}$/g OF PECTIN.

FOR GEL pH = 3.0
GS = △
GP = △

FOR GEL pH = 3.6
GS = ◉
GP = O

INFLUENCE OF CALCIUM LEVEL ON THE GEL POWER AND GEL STRENGTH OF A PRESENT TYPE OF LOW-ESTER PECTIN IN 30% SOLUBLE SOLIDS GELS.

INFLUENCE OF SOLUBLE SOLIDS LEVEL ON GEL STRENGTH OF A PRESENT TYPE OF LOW-ESTER PECTIN IN GELS MADE WITH 30 mg $Ca^{2+}$/g OF PECTIN.

INFLUENCE OF GEL pH ON THE GEL POWER AND GEL STRENGTH OF AN EXAMPLE OF THE INVENTIVE PECTIN IN A 30% SOLUBLE SOLIDS GEL MADE WITH 30 mg $Ca^{2+}$/g OF PECTIN.

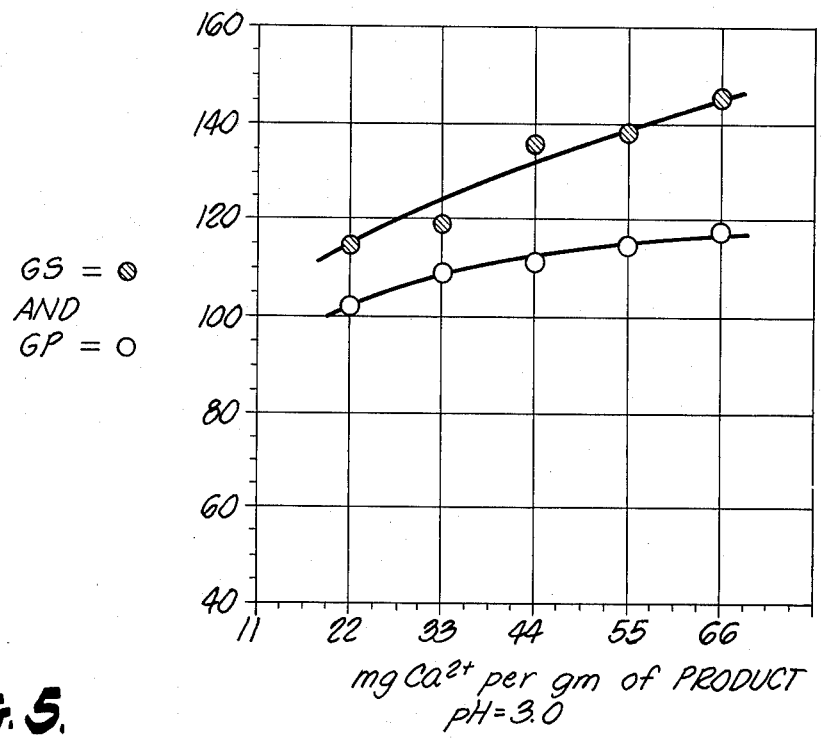
FIG. 5. INFLUENCE OF CALCIUM LEVEL ON THE GEL POWER AND GEL STRENGTH OF AN EXAMPLE OF THE INVENTIVE PECTIN IN 30% SOLUBLE SOLIDS GELS.
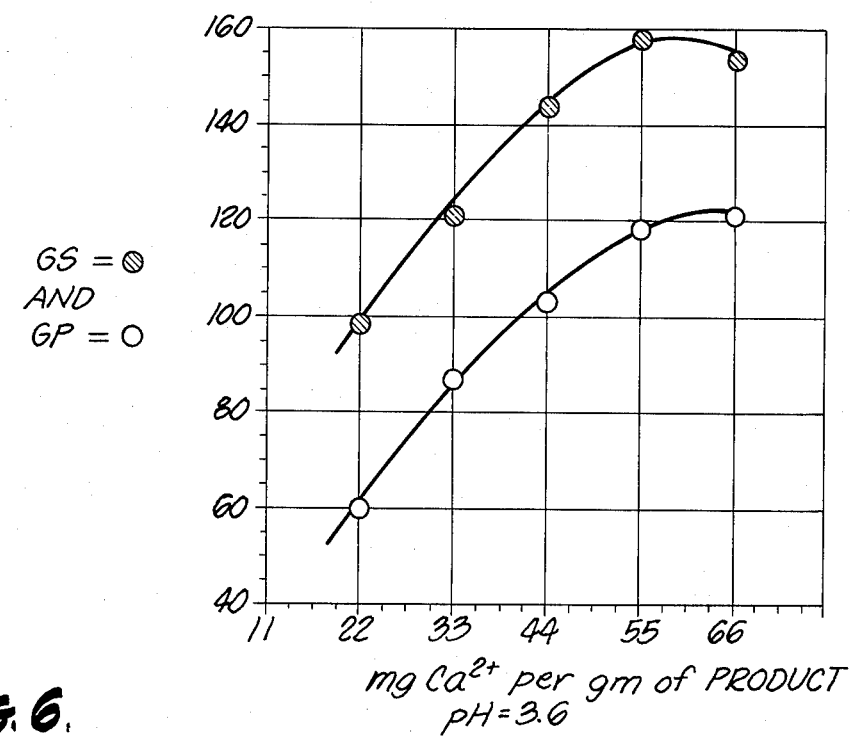
FIG. 6. INFLUENCE OF CALCIUM LEVEL ON THE GEL POWER AND GEL STRENGTH OF AN EXAMPLE OF THE INVENTIVE PECTIN IN 30% SOLUBLE SOLIDS GELS.

INFLUENCE OF SOLUBLE SOLIDS LEVEL ON GEL STRENGTH OF THE INVENTIVE PECTIN IN 30% SOLUBLE SOLIDS GELS.

INTERMEDIATE AMIDE PECTINS

SUMMARY OF THE INVENTION

This invention relates to novel derivatives of pectin, and more particularly to certain pectin amides having chemical and physical characteristics within specified ranges and possessing novel characteristics as gel forming agents.

As is well known, pectin is widely distributed in the plant world; particularly as a constituent of fruits such as lemons, oranges, and other citrus fruit; apples; sugar beets; and the like. It is a polymer formed mainly from (1→4) α-linked galacturonic acid units. An appreciable proportion of the carboxylic acid groups of native pectin are esterified with methyl alcohol. It is a water dispersible colloid and is responsible for the gelation of fruit juices and preserves in ordinary jelly and jam making. As a commercial product it is derived from sources such as citrus fruit, apples and the like, and is widely employed in the commercial and even the household production of jams and jellies.

It is a matter of common knowledge that the various consistencies, or more broadly taken the rheological characteristics of gelled products are subject to wide variation. These properties are of special importance in jellies and jams, where the product must have satisfactory characteristics for table use. Pectins with an ester level over 50%, based on the total level of carboxylic acid and ester, are described as high-ester pectins. Such pectins, further designated as rapid- or slow-set pectins, are used to form jams and jellies having soluble solids levels near 65%. Formation of the gelled state requires high levels of dissolved solids and a pH near 3. Textural variations are often related to differences in the force required to rupture gel slices.

Pectins modified so as to have ester levels under 50% are described as low-methoxyl or low-ester pectins and are used to form gels having reduced soluble solids levels. Formation of low-solids gels is dependent on the presence of a suitable multivalent cation, e.g., calcium (II). A high level of dissolved sugars is not required and pH control is less critical than in the case of high-solids products, i.e., the gelled state will form over a broader pH range than will a high-solids gel prepared from high-ester pectin. Gelled products with reduced solids content often have soluble solids levels near 30%, but calcium gelled products can be made having solids levels under 10% or over 50%. Those skilled in the art recognize that variations in the nature of the low-ester pectin, in the buffer salts, in solids content, and principally, in gel pH and level of added calcium will lead to varied gel textures. The most notable textural deficiency is syneresis, a release of water from the gelled network. Syneresis is most often associated with low-ester pectins that can accept only narrow or low levels of calcium.

Resilient low-solids gels that are not prone to syneresis or weeping are characterized by a high resistance to rupture when prepared under conditions that provide gels of similar sag characteristics. Methods used in the industry provide a way of evaluating a low-solids test gel for syneresis tendency. Briefly, when the ratio of Gel Strength (a measure of resistance to rupture) to Gel Power (a measure of gel forming ability) is increasing larger than one, the gel is progressively less prone to syneresis.

Indeed, as a general rule, for pectin derivatives including the inventive products, the following may be stated:

1. A Gel Strength/Gel Power ratio equal to or greater than one indicates a gel texture which tends to be smooth, extensible, and not prone to syneresis.
2. A Gel Strength/Gel Power ratio significantly over one (1.2 or larger) points to a magnification of these gel properties, i.e., the gel will have a favorable elastic limit and will exhibit little or no syneresis.
3. A Gel Strength/Gel Power ratio of less than one indicates a gel that tends to be brittle and prone to syneresis.
4. A further decrease of the Gel Strength/Gel Power ratio (0.8) indicates a gel of grainy texture and readily evident syneresis.

The presently known low-ester pectins, when evaluated in varied pH gels having about 30% soluble solids, show a steady decline in Gel Strength and Gel Power as the pH is increased from pH 3, a pH used for low-ester grading, to pH 3.5 and above. FIG. 1 shows a typical drop in Gel Strength and Gel Power for an example of the presently known low-ester pectins. Gelling ability and resistance to rupture are lowered in the pH range of end use, i.e., pH 3.2 to 3.8. This behavior is further compounded by the increased sensitivity of Gel Strength to higher calcium levels in the pH range of end use as shown in FIG. 2. The decrease in Gel Strength brought about by increased calcium is promptly manifested as syneresis. To some extent, the decrease in Gel Strength brought on by increased calcium can be overcome by a low-ester pectin of higher molecular weight as taught by Wiles, cited below. In addition, when compared to gels having 30% soluble solids the 40 and 50% soluble gels prepared with presently known low-ester pectins show a distinct loss in Gel Strength. This behavior is shown in FIG. 3. Hence, most of the presently known low-ester pectins suffer loss of gel resilience and are prone to syneresis in end use applications where varied conditions of pH, calcium concentration and solids content do not allow the formation of gels having desirable textural properties.

An object of the present invention is to provide a novel pectin derivative having desirable gel forming properties and freedom from syneresis throughout the pH range characteristic of low-solids gels with tolerance for large variations in calcium content.

Another object of the invention is to provide a novel process for the production of such pectin derivatives.

Other objects of the invention will appear as the description thereof proceeds.

BRIEF DESCRIPTION OF THE DRAWINGS

In the Drawings:

FIGS. 4 through 7 show selected gel properties of various of the inventive preparations.

PRIOR ART

Figure 1:
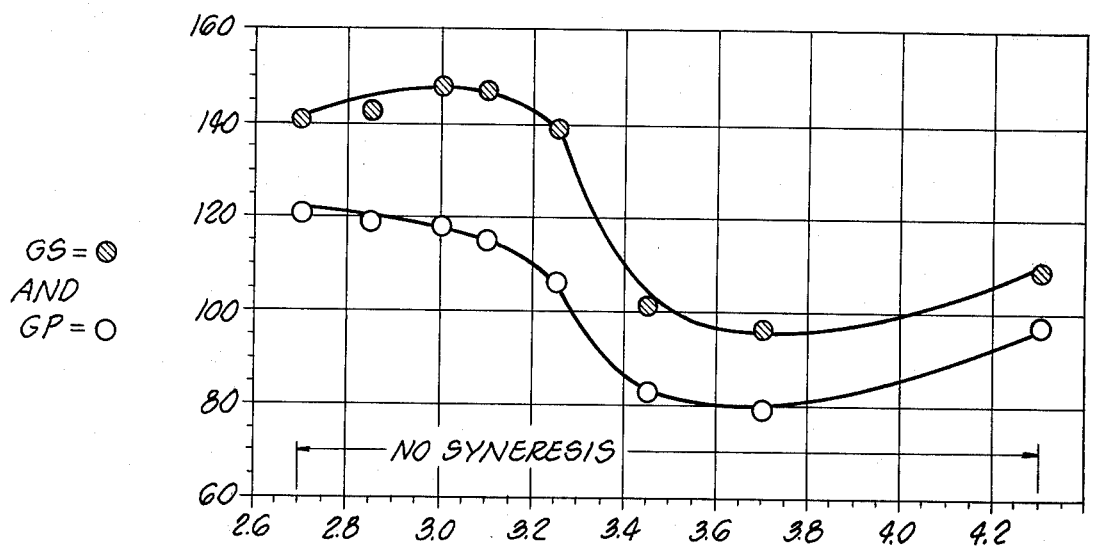
FIGS. 1 through 3 show selected gel properties of a prior art pectin.
Figure 2:
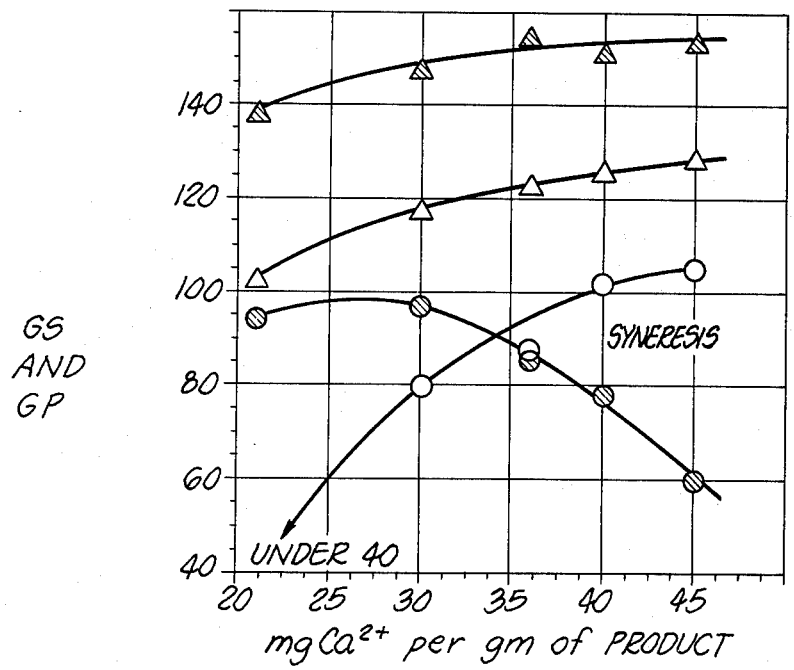
Figure 3:
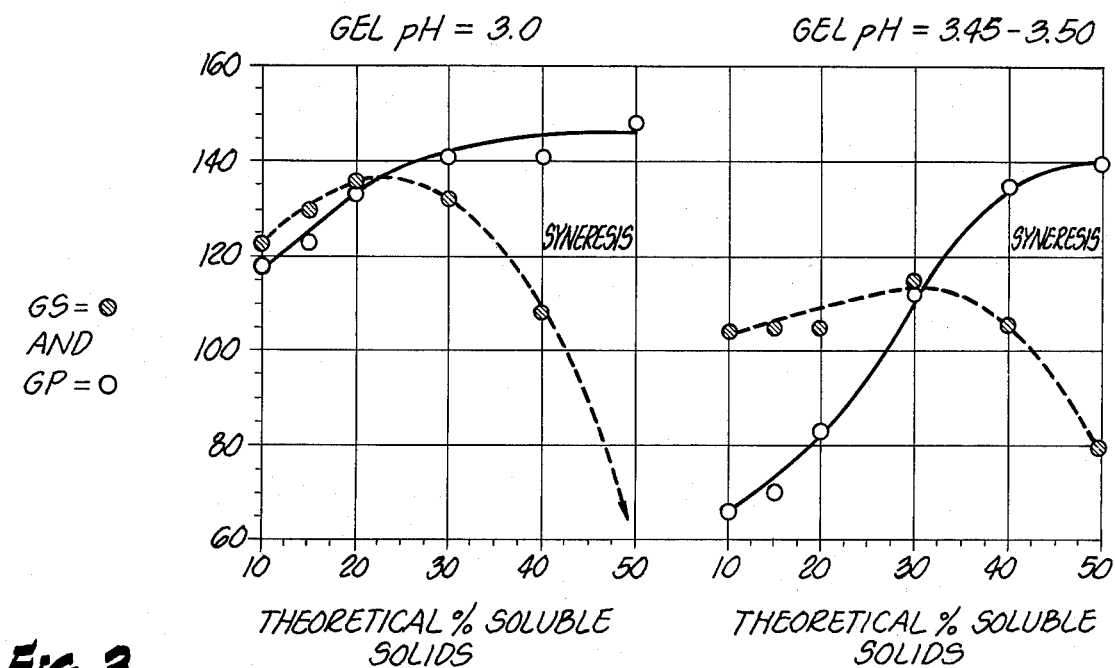

Conversion of a portion of the ester groups on pectin to amide is known. A typical procedure is shown in U.S. Pat. No. 2,480,710 to Bryant; and procedures taught in U.S. Pat. No. 3,622,559 to Wiles et al, will lead to certain amide derivatives. Also of interest is U.S. Pat. No. 3,835,111.

Amide derivatives of pectin are also taught in the article by Solms in *HELVETICA CHEMICA ACTA*, 37, 2153–2160 (1954) and by Solms et al, in *JOURNAL OF POLYMER SCIENCE*, 12, 559–564 (1954); also by Mitchell in *FOOD TECHNOLOGY*, 4, 135,138 (1950) and by Bock & Lange in *DIE NAHRUNG*, 7, 71–78 (1963).

GENERAL DESCRIPTION OF THE INVENTION

Generally speaking, and in accordance with illustrative embodiments of my invention, I introduce amide groups into pectin by treatment with a high level of ammonia. The high level of ammonia is achieved by mixing liquid ammonia with a suitable organic solvent such as isopropanol, acetone, normal butanol, ethanol or the like. The reaction is preferably carried out at a low temperature such as 0° C. At much below that temperature, for example −20° C, the reaction proceeds so slowly as to be unfavorable from an economical processing standpoint; whereas at much higher temperatures, for example +20° C, the reaction proceeds so rapidly that control to give a uniform product becomes difficult. After the reaction has proceeded to the desired extent the pectin derivative is filtered, washed in alcohol and acidified with mineral acid.

If the added acid is in excess of that needed to neutralize residual ammonia and convert the ammonium salts of the pectin to the proton form, then the acidic pectin is filtered again, rinsed with alcohol, and treated with an appropriate alkali to convert a portion of the pectin carboxyl groups to the salt form. If the acid addition is controlled so that the residual ammonia and only a portion of the ammonia salt of the pectin is converted to the proton form, then no further reagents are needed. The product may then be filtered, rinsed, dried and ground to any desired degree of fineness.

The starting pectin may be any of the commercially available high-ester pectins such as citrus pectin, apple pectin or the like, and a degree of esterification over 60% is essential and indeed over 65% is preferred. Such pectins are designated in the trade as rapid-set or medium-rapid-set pectins. Pectins which have been esterified to even higher levels, as approaching or exceeding 80%, by methods well known in the art can also serve as starting materials, but the use of such pectins provides no significant advantage in the gel properties of the final product. Even though treatment of high-ester pectins with excess ammonia at low temperatures does not result in significant molecular weight loss, it is essential to use a starting high-ester pectin of molecular weight sufficiently high to insure that the final derivative has a molecular weight over 110,000 and a Gel strength to Gel Power ratio over one. As a practical matter this is accomplished by using a starting high-ester pectin of molecular weight at least about 130,000. I prefer rapid-set pectin from lemons, as conveniently obtained from lemon peel by methods of extraction, precipitation, and alcohol washing well known in the art.

The degree of amidification is considered complete within the present invention when the amide level is at least 27%, the acid level is not more than 39%, and the total of acid and amide is within the relatively narrower range of 56–70%, the balance consisting of methyl ester groups. The amidified pectin has an apparent molecular weight in excess of 110,000, a Gel Power of about 100 and a ratio of Gel Strength to Gel Power in excess of unity. The preferred amide level is 30% to 35%.

The acid and amide level percentages are based on the total possible level of carboxyl radicals at carbon-six of the anhydrogalacturonic acid residues. The carboxyl radicals may, as will be apparent to those skilled in the art, exist as carboxyl groups, as amides, or as methyl esters. Accordingly, on a percentage basis it is clear that the acid, amide, and ester levels total 100% in any given case.

Before proceeding with a further elucidation of my invention, some definitions will now be given.

the acid, amide and ester levels may be readily determined by conventional chemical analaysis methods well known to those skilled in the art. I prefer the methods outlined below.

The dried and ground sample is washed with acid-alcohol to remove ash and buffer materials and residual acid is rinsed from the sample which is then dried to a moisture level of 10% or less. A 500 mg portion of the acid-washed and dried sample is titrated in $CO_2$-free water with 0.1 N NaOH to phenolphthalein end point to give the milliequivalents of carboxylic acid. A 20.0 ml portion of 0.5 N NaOH is added, the flask closed and allowed to stand for 15 minutes for saponification, a 20.0 ml portion of 0.5 N HCl is added and the meq level of ester is determined with further titration using 0.1 N NaOH to phenolphthalein end point. To determine amide a 500 mg sample of the said washed and dried pectin is added to the round bottom flask of an ammonia distillation apparatus. Add 20.0 ml of 0.1 N HCl in the collection tube and add 50 ml of 5 N NaOH to the round bottom flask containing the pectin. Assemble the apparatus to be gas tight, connect the gas inlet tube to a $N_2$ source, adjust $N_2$ flow to give a slow flow into the collection flask. Reflux the round bottom contents for 45 minutes, then titrate the contents of the collection tube with 0.1 N HCl to a methyl red end point. Subtract meq of NaOH used from meq of HCl added originally to find meq of amide. Calculate the percent of each functional group by the meq of each group and the meq total.

The Gel Power is directly related to the modulus of rigidity of a standard aqueous gel made from a given pectin, and is obtained by noting the amount of slump when a standard test gel in frusto-conical shape is allowed to sag with unsupported sides under the influence of gravity. The general procedure is a well accepted method within the industry for determining the gelling potential of a pectin. A specific procedure for Gel Power, a measure of the gelling ability of a low-ester pectin in a low-solids gel, is set forth on pages 580–581 of the test *FOOD CHEMICALS CODEX*, Second Edition, National Academy of Sciences, Wash., D. C., 1972 which is hereby included herein by reference. Solutions of citric acid, sodium citrate, and calcium chloride should be prepared on a molar basis rather than the molal basis cited in the text. For a pectin sample where Gel Power is unknown, an initial determination must be made by assuming a Gel Power (assumed Gel Power = 600/w where w is weight in grams of the pectin used in gel preparation). Based on the Gel Power indicated in the initial gel evaluation, a second preparation can be made to further confirm Gel Power. Experience indicates that a second evaluation will confirm results found in a first probe if the first sag readings are between 16 and 25. The test gels are 30% by weight solids plus solubles.

The Gel Strength is determined on the same test gel by determining the force necessary to push the gel beyond its elastic limit to its point of rupture. This is determined in a manner known to those skilled in the art by the use of a Gelslice Penetrometer, a mechanical modification of the well known Tarr-Baker Jelly Tester.

The gels from the Gel Power test are cut into slices 6–7 mm thick, the bottom slice is discarded, the next four slices are transferred to the top of a scale and the force in grams to rupture each slice is recorded. The eight rupture values are averaged. Gel Strength can be determined as GS = [600/w] [1 + (x − 235)(0.0025)] where w = weight in grams of pectin used, x = average rupture strength in grams and 600/w represents Assumed Gel Strength. When rupture strength is out of the range of 150 to 330 g, the Gel Strength is estimated and the gel remade using the estimated Gel Strength as the new Assumed Gel Strength.

An indication of molecular weight is given by a viscometric procedure, well known to those skilled in the art, and may be summarized as follows:

Molecular Weight

A 0.1% sol is prepared from the sample in a 1% solution of sodium hexametaphosphate. The viscosity of a filtered portion (7 ml) of the sol is determined with a modified Ostwald-Cannon-Fenske Series 100 pipette at 20° C. The molecular weight is calculated using the formula:

$$\text{Molecular weight} = \frac{\left[\eta_r \frac{1}{P-1}\right]^P}{CK}$$

Where $\eta_r$ = relative viscosity (sol flow time in seconds/flow time of 1% sodium hexametaphosphate)
P = 6
C = concentration in terms of grams of moisture and ash-free sample per 100 ml of sol.
K = $4.7 \times 10^{-5}$ As mentioned, Gel Power and Gel Strength and particularly their ratio are important practical characteristics for the rapid assessment of the excellence or lack of same of a given pectin preparation as far as its gel forming and consistency increasing properties are concerned. These values are routinely determined in the commercial production of various pectins and are used in quality control during manufacture and are relied upon by commercials and industrial users.

Figure 4:
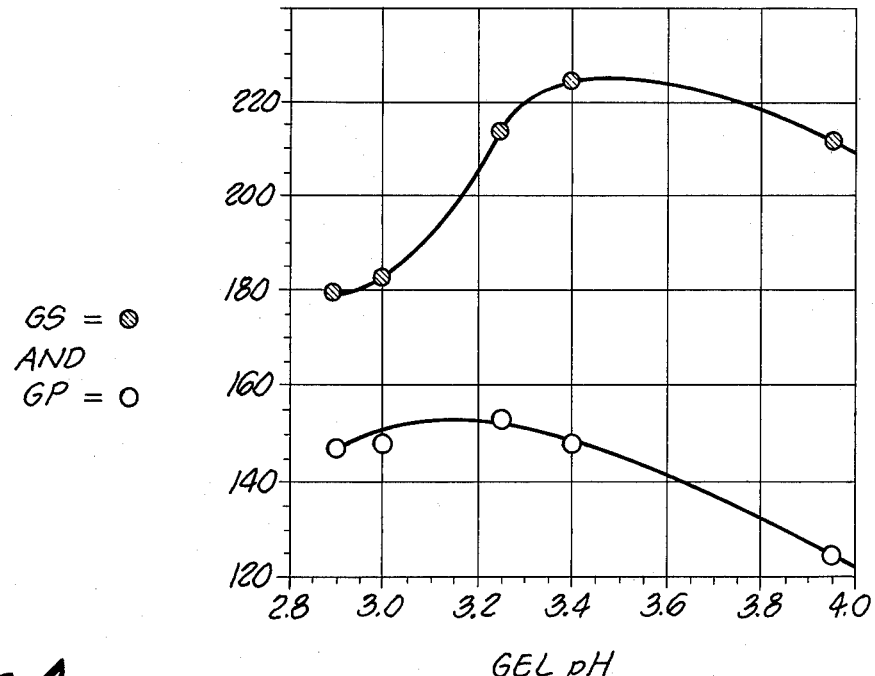

As will be shown hereinbelow, the products in accordance with the invention have highly useful and indeed unique properties in this field. For example, considering a 30% soluble solids gel made with 30 milligrams of calcium ion per gram of an example of the inventive pectin, the following characteristics, illustrated in FIG. 4, are obtained:

a. Gel Power is retained or only slightly decreased as gel pH is varied from 3.0 to 4.0.
b. Gel Strength is retained or increased as gel pH is varied from 3.0 to 4.0.
c. The ratio of Gel Strength to Gel Power is always over one in the pH range of end use (pH 3.4 to 3.8).

Further, the inventive pectins form low-solids gels, with a wide range of calcium levels, in which Gel Strength is not lost at gel pH's near 3.0 or over 3.5. FIGS. 5 and 6 show this characteristic.

Figure 7:
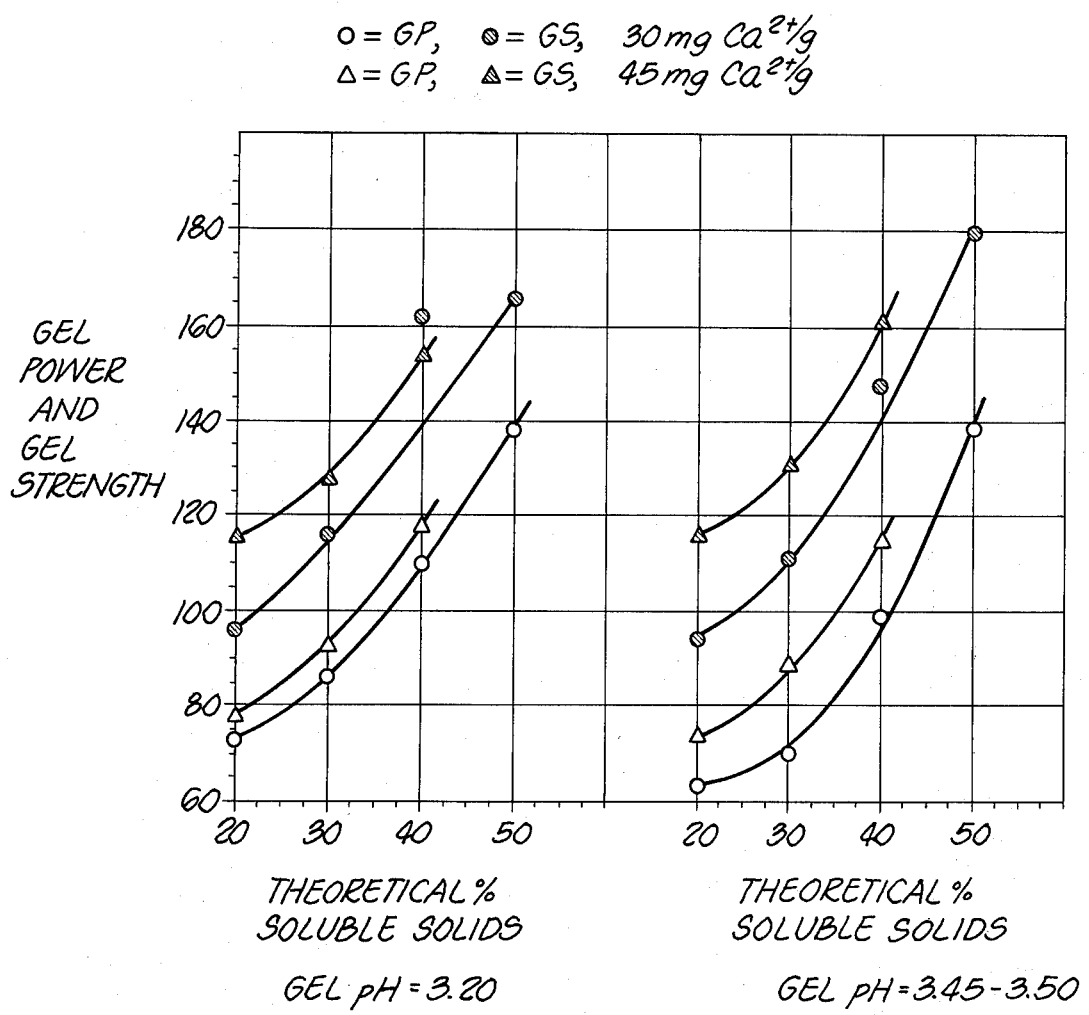

The new pectins are also able to retain Gel Strength in low-solids gels having solids levels over 30%. The characteristic is displayed in FIG. 7.

Coming now to the general procedure I use in preparing the inventive products, as already mentioned this is a low temperature conversion utilizing liquid ammonia in a suitable solvent. Not only is the procedure an extremely simple one-step reaction for introducing the desired amide level, but it has the advantages of not appreciably lowering the molecular weight by chain-breaking and not increasing greatly the level of pectin carboxyl groups as might well occur at higher temperatures or with the use of relatively drastic conditions such as mineral acids.

The use of liquid ammonia allows a high level of ammonia to be brought in contact with the pectin to gain a rapid conversion of ester groups to amide groups. Reaction solutions which are intially over six normal in ammonia are most desirable in terms of convenient reaction times at low temperatures (as under 10° C), small amounts of chain cleavage and small levels of ester hydrolysis. These levels of ammonia cannot be achieved with concentrated ammonium hydroxide (∼14 N ammonia in water) without some solubilization of the pectin due to the high water content of such a reaction solution. Reaction solutions which are initially over three normal in ammonia are less useful in terms of reaction time. Such solutions can be prepared with aqueous ammonia and high proof solvent, but are more conveniently prepared with liquid ammonia and lower-proof solvents.

The solvent used must, of course, not itself react with ammonia, thus excluding such materials as acetic acid. Likewise, it must remain liquid when admixed with liquid ammonia over the operating temperature range already given. It should be sufficiently polar and sufficiently hydrophilic to render the starting pectin fully accessible to the ammonia. In general, an oxygenated organic solvent having a dielectric constant of at least 5 at 15° C and being nonreactive with ammonia is a practical criterion. The solvents already mentioned are adequate and may contain a minor amount of water. Indeed, I find best and prefer a 70 volume percent aqueous isopropanol solution, a composition that is conveniently achieved in a plant situation.

The operating conditions for preparing the products are simple: liquid ammonia is added to the prechilled solvent, the starting pectin is added and the mixture is stirred for most of the pre-selected reaction time. At the end thereof the solids are filtered and washed with a chilled solvent, such as those already listed for the reaction. Repeated treatments involving cold solvent washing and filtration will give a product that requires little acid in the final wash step. The final wash step in pectin manufacture often involves addition of a base or an acid to secure a balance of free carboxyl groups and carboxyl acid salts in the pectin so that the final dried and ground pectin will form a 1% sol having a pH compatible with end usage. For ease of manufacture I prefer to add acid to the cold solvent wash. If excess acid is added to neutralize all residual ammonia and to convert all carboxyl acid salts to free carboxyl then, after filtration, the pectin can be washed in the presence of added base to secure the proper balance of the desired carboxylic acid salt. I prefer to add sufficient to the wash solution to give pH 2 in order to quickly neutralize residual ammonia. As acid permeates the pectin particles, the pH rises. By adding acid, the pH is maintained at a pH over 3 for a period of one hour. By such control of the final pH of the wash, the 1% sol pH of the finished pectin can be controlled for end use demands. After filtration, and further optional solvent washing, the pectin is dried and ground for subsequent standardization and sale or use.

Table 1 gives the reaction conditions for five different preparations of the inventive product. Table 2 displays the analysis results for the five products.

Table 1

| Reaction | Pectin[a], g | Liquid Ammonia, ml | 70% Isopropanol, ml | Reaction time, min. | Temp. °C |
|---|---|---|---|---|---|
| A | 540 | 400 | 550 | 13 | 2-4 |
| B | 275 | 200 | 250 | 20 | 4-7 |
| C | 820 | 600 | 825 | 13 | 3 |
| D | 270 | 150 | 325 | 60 | 0 |
| E | 270 | 100 | 375 | 66 | 0 |

Table 2

| Reaction | Parent pectin | | | | | | Product pectin | | | | |
|---|---|---|---|---|---|---|---|---|---|---|---|
| | % ester | MW × 10$^{-3}$ | % acid | % ester | % amide | % acid + amide | MW × 10$^{-3}$ | GP[a,b] | GS[a,b] | GP[a,c] | GS[a,c] |
| A | 73 | 196 | 32 | 37 | 31 | 63 | 165 | 148 | 183 | 145 | 225 |
| B | 76 | 218 | 25 | 41 | 34 | 59 | 170 | 135 | 157 | 120 | 181 |
| C | 72 | 134 | 29 | 39 | 32 | 61 | 113 | 108 | 116 | 94 | 125 |
| D | 72 | 147 | 27 | 39 | 34 | 61 | 143 | 118 | 131 | 119 | 180 |
| E | 72 | 136 | 29 | 43 | 28 | 57 | 136 | 92 | 141 | 80 | 122 |

[a]Evaluation in 30% soluble-gels using 30 mg Ca$^{2+}$/g of pectin.
GP = Gel Power, GS = Gel Strength.
[b]Gel pH 3.
[c]Gel pH 3.5 (less citric acid).

A considerable spread is evident in the reaction temperature, time, and level of ammonia used to achieve the desired product composition. A unique set of conditions that will allow preparation of the inventive product in its most desirable form is difficult to describe for a laboratory preparation, or more so, for a plant-scale preparation. The origin of the starting pectin and the state of the starting pectin, as volatiles content, pectin ester level, residual mineral acid from prior treatment, together with reaction time, temperature, solvent, ammonia level and the conditions used to terminate the reaction, as time, temperature, level of added mineral acid, all influence the composition of the final product. However, a pilot test is very simple and the guides given in Table 3 provide the framework for such pilot runs.

Table 3

| R = Ratio of ammonia(vol) solvent(vol) | N = Approx. ammonia normality before pectin addition | Reaction time | R$^{-0.7}$ × N |
|---|---|---|---|
| 1/1 | over 12 N | under 30 min | 12.0 |
| 1/1.67 | over 9 N | under 60 min | 12.9 |
| 1/3 | over 6 N | under 120 min | 12.9 |
| 1/7 | over 3 N | under 210 min | 11.7 |

The fourth column o Table 3 shows the product of the −0.7 power of the volume ratio of ammonia to solvent (R$^{-0.7}$) and the minimum recommended normality of the ammonia prior to the pectin addition (N). This product should exceed about 10, and preferably between about 11 to 13, as shown by Table 3.

While dry pectin powders may be used as a starting material, Table 3 is applicable to starting pectin of over 65% ester in a wet form (over 50% volatiles) and having a pH over 3 which are the pectins most likely to be used in manufacture. Pre-chilled solvent is used to give the desired temperature. The ratio of pectin in grams to the total volume of ammonia plus solvent in milliliters will be near 1/1.4 to 2 and reaction temperature will be 0° C to 15° C. If time of filtration exceeds 10 minutes, filter time should be considered as part of reaction time. Temperature during termination of the reaction should not exceed 30° C and pH should be controlled to remain under pH 4.

With further reference to the inventive process by which I produce my inventive products, I have already described the reaction conditions as respect temperature, time, nature of the solvent and with reference to the relative proportions among the several components, viz., pectin, ammonia, solvent, and optionally a minor proportion of water admixed with the solvent. I now give two working examples.

EXAMPLE 1

A 150 ml portion of liquid anhydrous ammonia is added to a suitable vessel and 250 ml of a pre-chilled (−20° C) solvent (7/3, isopropyl alcohol/water, v/v) is slowly added with mild agitation. A 250 g portion of wet-white pectin (67% volatiles, as is pH = 3.5) is rapidly added and the container is placed in a 0° bath. The container contents are held at 0° C with mild agitation for 30 minutes, filtered, rinsed with 70% isopropanol, the solids added to 1500 ml of ambient 70% isopropanol containing 75 ml of concentrated hydrochloric acid, stirred for two minutes as temperature approaches 30° C and filtered. The solids are added to 1500 ml of ambient 70% isopropanol and slowly agitated while concentrated hydrochloric acid is added periodically to maintain a pH under 4. When a stable pH between 3 and 4 results, the solids are filtered, rinsed with solvent (70% isopropanol or acetone), dried to under 10% volatiles and ground to pass 40 mesh for gel testing and analysis.

EXAMPLE 2

The procedure described in Example 1 is followed except that the mixture of ammonia, solvent and pectin is held at 0° C for 45 minutes and the two 1500 ml portions of acid containing 70% isopropyl alcohol are pre-chilled to −20° C.

The characteristics of the pectin materials are listed below.

Table 4

| Sample | % COOH | % COOCH$_3$ | % CONH$_2$ | % acid + amide | MW×10$^{-3}$ | GP[a,b] | GS[a,b] | GP[a,c] | GS[a,c] |
|---|---|---|---|---|---|---|---|---|---|
| Starting pectin | 29 | 71 | — | — | 165 | — | — | — | — |
| Pectin from Example 1 | 33 | 37 | 30 | 63 | 129 | 106 | 145 | 92 | 133 |

Table 4-continued

| Sample | % COOH | % COOCH$_3$ | % CONH$_2$ | % acid + amide | MW×10$^{-3}$ | GP$^{a,b}$ | GS$^{a,b}$ | GP$^{a,c}$ | GS$^{a,c}$ |
|---|---|---|---|---|---|---|---|---|---|
| Pectin from Example 2 | 32 | 37 | 31 | 63 | 142 | 117 | 164 | 101 | 169 |

$^a$Evaluation in 30% soluble-solids gels using 30 mg of Ca$^{2+}$/g of pectin. GP = Gel Power, GS = Gel Strength.
$^b$Gel pH 3.
$^c$Gel pH 3.4 (less citric acid).

A consideration of the drawings will point out to those skilled in the art the superiority of the gel characteristics of the inventive product over the gel characteristics of present pectins used to prepare gelled products of low solids content. The present low-ester pectins having acid levels in excess of 40% and amide levels under 25% are well outside of the scope of the present invention. The contrast between FIG. 1 and FIG. 4 shows the superior retention of Gel Power and Gel Strength displayed by the inventive product as gel pH is increased. Retention of the Gel Strength with increased calcium content at a pH near 3 and near 3.6 is shown for the inventive product in the contrast of FIG. 2 to FIGS. 5 and 6. Finally, the ability of the inventive product to provide increased Gel Strength as soluble solids level is increased from 20% to over 40% is seen in the contrast of FIG. 3 to FIG. 7.

The novel pectin amides in accordance with the invention have manifold utility in diverse industrial applications. For example, they are useful in petroleum well drilling and production, as additives to fracturing fluids to increase propping agent supportability and lower the filtration rate. Likewise, their gel-forming ability may be used to advantage in the time-reversible selective plugging procedure employed in acidizing wells, as taught in U.S. Pat. No. 2,259,419. The delayed liquefaction in that method may be provided by pectinases directly, or by including suitable pectinase-elaborating microorganisms in the gel. Again, my novel pectin amides are useful as additives to Portland cement, as setting time retarders and settling inhibitors. Still further, they may be used in the lining or irrigation ditches to reduce water loss by seepage. Additionally, the inventive pectins are useful in protecting shore lines from oil spill damage, in the fashion set forth in *CHEMICAL AND ENGINEERING NEWS* (C & EN), pages 30 and 31, Dec. 8, 1975.

While specific details have been shown and described, it should be understood that changes and alterations may be resorted to without departing from the spirit of the invention as defined in the appended claims.

I claim:

1. A pectin derivative having not more than 39% carboxyl groups, and at least 27% amide groups, with the total of said carboxyl and said amide percentages within the range from 56 to 70%; the balance being methyl ester groups and having an apparent molecular weight in excess of 110,000.

2. The pectin derivative in accordance with claim 1 in which said pectin has a Gel Power about or in excess of 100, and a ratio of Gel Strength to Gel Power in excess of unity.

3. The pectin derivative in accordance with claim 2 in which said pectin is citrus pectin.

4. The pectin derivative in accordance with claim 3 in which said citrus is lemon.

5. The pectin derivative in accordance with claim 1 in which said pectin is citrus pectin.

6. The pectin derivative in accordance with claim 5 in which said citrus is lemon.

7. The pectin derivative in accordance with claim 1 wherein the amide level is 30 to 35%.

8. A process of forming an amide derivative of pectin which comprises the steps of immersing pectin in a solution of liquid ammonia and a solvent at a temperature within the range −15° C to +15° C for a time sufficient for said pectin to achieve an amidification of at least 27% with not more than 39% carboxyl groups and a total of acid plus amide groups of from 56 to 70% with the balance having methyl ester groups, said solvent comprises an oxygenated organic solvent having a dielectric constant at 15° C of at least 5; and thereafter removing said amide derivative from said solution.

9. The process in accordance with claim 8 in which the product of the −0.7 power of the volume ratio of said ammonia to said solvent and the normality of said ammonia prior to said immersion of said pectin exceeds about 10.

10. The process in accordance with claim 9 in which said pectin is citrus pectin.

11. The process in accordance with claim 10 in which said citrus is lemon.

12. The proces in accordance with claim 8 in which said pectin is citrus pectin.

13. The process in accordance with claim 12 in which said citrus is lemon.

14. The process in accordance with claim 8 in which said solvent contains a minor amount of water.

15. The process in accordance with claim 14 in which said solvent is aqueous isopropanol containing 70% by volume of isopropanol.

16. The process in accordance with claim 8 wherein the solvent is selected from the group consisting of isopropanol, acetone, normal butanol and ethanol.

17. The process in accordance with claim 8 in which said solvent is isopropanol.

18. The process in accordance with claim 8 wherein the starting pectin which is immersed in a solution of ammonia has a degree of esterification over 60%.

19. The process in accordance with claim 18 in which the degree of esterification of the starting pectin is over 65%.

20. The process in accordance with claim 8 in which the pectin is immersed in a solution of liquid anhydrous ammonia and a 7/3 isopropanol alcohol/water solvent.

21. The process in accordance with claim 8 in which the solution of ammonia and solvent is initially over six normal in ammonia.

* * * * *

UNITED STATES PATENT OFFICE
CERTIFICATE OF CORRECTION

PATENT NO. : 4,065,614
DATED : December 27, 1977
INVENTOR(S) : DENNY B. NELSON

It is certified that error appears in the above–identified patent and that said Letters Patent are hereby corrected as shown below:

Column 6, line 59, --acid-- should be inserted after "sufficient".

Column 7, directly beneath Table 2, in the first statement defining (a), "soluble-gels" should read --soluble-solids gels--.

Signed and Sealed this

Twenty-third Day of May 1978

[SEAL]

Attest:

RUTH C. MASON
Attesting Officer

LUTRELLE F. PARKER
Acting Commissioner of Patents and Trademarks